United States Patent [19]
Mirochnitchenko et al.

[11] Patent Number: 6,109,023
[45] Date of Patent: Aug. 29, 2000

[54] DEVICE FOR CLEANING EXHAUST GASES

[76] Inventors: Fedor Mirochnitchenko, 425 42nd St., Brooklyn, N.Y. 11232-3509; Shlomohai Niyazov, 1255 44th St., Brooklyn, N.Y. 11219

[21] Appl. No.: 09/276,114

[22] Filed: Mar. 25, 1999

[51] Int. Cl.[7] .............. F02M 25/07; F01N 3/28
[52] U.S. Cl. .............. 60/278; 60/286; 60/301; 60/303; 123/568.15
[58] Field of Search .......... 123/568.11, 568.12, 123/568.15, 567; 60/274, 278, 279, 299, 301, 302, 311, 286, 303

[56] References Cited

U.S. PATENT DOCUMENTS

| | | | |
|---|---|---|---|
| 1,992,265 | 2/1935 | Weeks .................. | 123/568.15 |
| 2,954,967 | 10/1960 | Johnson ................ | 123/568.15 |
| 3,702,110 | 11/1972 | Hoffman et al. ........ | 123/567 |
| 4,587,807 | 5/1986 | Suzuki ................. | 60/278 |
| 4,674,463 | 6/1987 | Duckworth et al. ..... | 60/278 |
| 4,984,426 | 1/1991 | Santi .................. | 60/278 |
| 5,016,599 | 5/1991 | Jubb ................... | 60/278 |
| 5,284,016 | 2/1994 | Stark et al. .......... | 60/303 |
| 5,452,577 | 9/1995 | Langer ................. | 60/302 |
| 5,692,373 | 12/1997 | Atmur et al. .......... | 60/302 |
| 5,761,903 | 6/1998 | Straka ................. | 60/278 |

*Primary Examiner*—Willis R. Wolfe
*Attorney, Agent, or Firm*—I. Zborovsky

[57] ABSTRACT

A vehicle has with an outlet for discharging exhaust gasses and an inlet for introducing a gas into the internal combustion engine, and an exhaust gas system including an exhaust gas conduit having an inlet which is connected with the outlet of the internal combustion engine so as to receive the exhaust gasses from the internal combustion engine, and an outlet which is connected with the gas inlet of the internal combustion engine so that the exhaust gasses which pass into the conduit from the outlet of the internal combustion engine into the inlet of the conduit pass through the conduit and are supplied back into the internal combustion engine without discharging into an environment.

9 Claims, 1 Drawing Sheet

DEVICE FOR CLEANING EXHAUST GASES

BACKGROUND OF THE INVENTION

The present invention relates to a device for cleaning exhaust gasses from an internal combustion engine of a vehicle.

All vehicles with internal combustion engines have a discharge through which exhaust gasses are discharged into atmosphere. As a result, irreparable damage is done to humans and environment.

SUMMARY OF THE INVENTION

Accordingly, it is an object of the present invention to provide a device for cleaning exhaust gasses of internal combustion engines of vehicles, which avoids the disadvantages of the prior art.

In keeping with these objects and with others which will become apparent hereinafter, one feature of present resides, briefly stated in a vehicle for cleaning exhaust gasses which has a vehicle part to be movable on a road; an internal combustion engine mounted on said vehicle for driving said vehicle for movement on the road, said internal combustion engine having an outlet for discharging exhaust gasses and an inlet for introducing a gas into said internal combustion engine, and an exhaust gas system including an exhaust gas conduit having an inlet which is connected with said outlet of said internal combustion engine so as to receive the exhaust gasses from said internal combustion engine, and an outlet which is connected with said gas inlet of said internal combustion engine so that the exhaust gasses which pass into said conduit from said outlet of said internal combustion engine pass through said conduit and are supplied back into said internal combustion engine without discharging into an environment.

The present invention also deals with an internal combustion engine which has an engine part, said engine part having an outlet for discharging exhaust gasses from said engine part and an inlet; and an exhaust gas system including an exhaust gas conduit having an inlet which is connected with said outlet of said internal combustion engine so as to receive the exhaust gasses from said internal combustion engine, and an outlet which is connected with said gas inlet of said internal combustion engine so that the exhaust gasses which pass into said conduit from said outlet of said internal combustion engine pass through said conduit and are supplied back into said internal combustion engine without discharging into an environment.

DESCRIPTION OF PREFERRED EMBODIMENT

Figure 1:
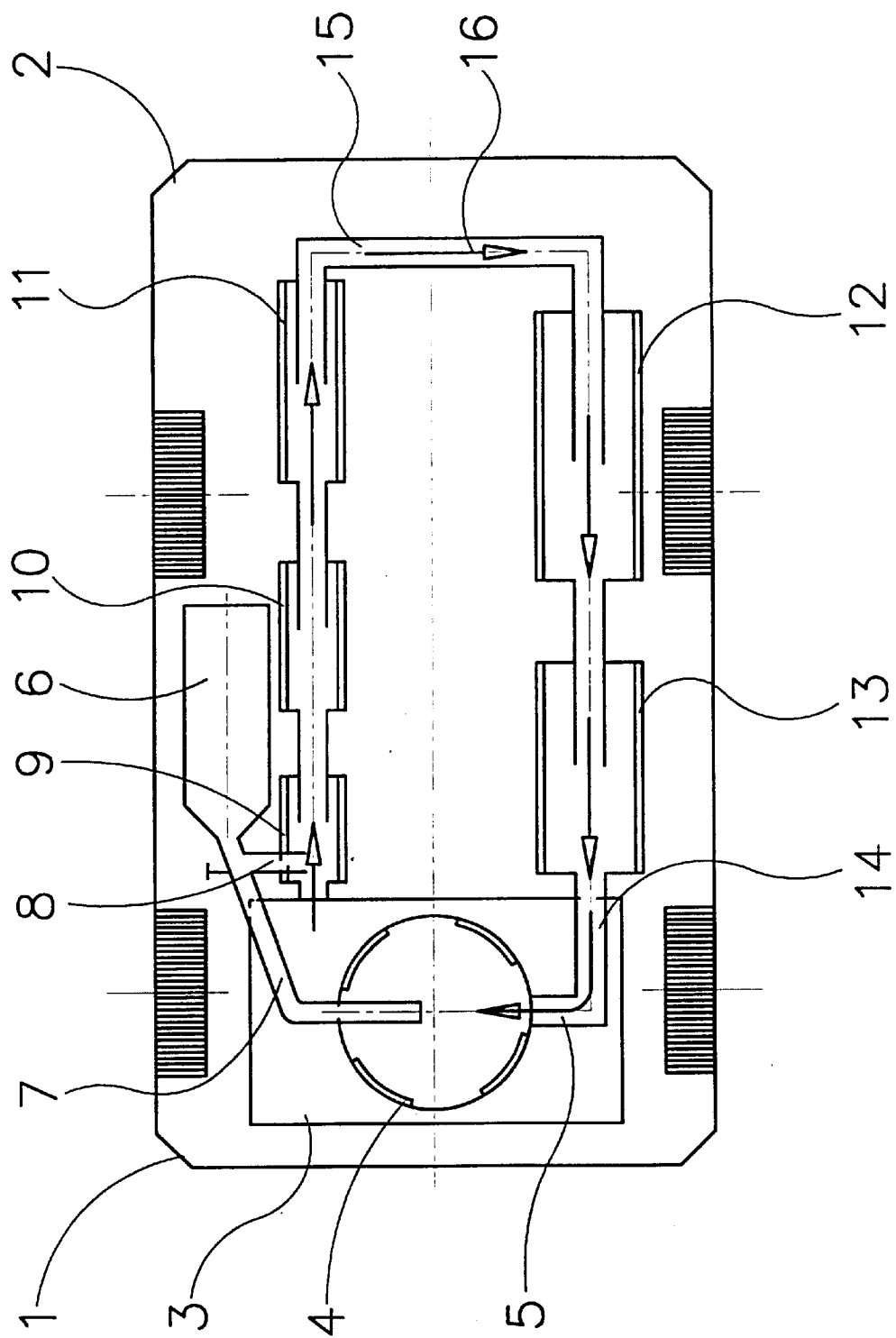
FIG. 1 of the drawings is a single FIGURE showing a vehicle provided with an internal combustion engine and a device for cleaning exhaust gasses from the internal combustion engine.

As shown in FIG. 1, a vehicle, for example an automobile has a front part identified with reference numeral 1 and a rear part identified with the reference numeral 2. An internal combustion engine 3 drives the vehicle, for example it operates rear wheels. The internal combustion engine is provided with an air filter 4. An interior of a filter housing is covered with tiles of ceramics and a layer of titanium oxide. A conduit which has portion 15,14, and 5 has an inlet connected with an outlet for discharging exhaust gasses from the internal combustion engine 3. The conduit also has an outlet which is connected with an inlet of the filter 4.

Reference numeral 6 identifies a vessel which contains a mixture of air and oxygen, for example with the ratio 88%:12% of oxygen to air. A pipe 7 leads from the vessel 6 directly into the internal combustion engine, while a pipe 8 leads from the vessel 7 into the portion of the conduit, in particualar into an additional chamber 9. The conduit is provided with vessels 10, 11, 12 and 13 which are covered inside by ceramic tiles with a layer of titanium oxide. The directional movement of the gasses is identified with reference numeral 16.

The device operates in the following manner.

During the operation the internal combustion engine exhaust gasses are discharged from the internal combustion engine through the discharge outlet and introduced into the conduit. The layer of titanium oxide absorbs admixtures in the exhaust gasses which are hazardous for humans and for engine as well. The titanium oxide layer can be periodically washed by a tap water, for example once in 30 days. While the washing system is not shown in the drawings, it could be of any construction.

The exhaust gasses which are discharged from the internal combustion engine pass through the conduit and are again introduced into the internal combustion engine, in particular into filter 4 where they are cleaned. The cleaned gas is again introduced into the internal combustion engine. Therefore, no exhaust gasses are discharged into atmosphere whatsoever. In addition, a portion of the air-gas mixture can be introduced from the vessel 6 into the chamber 9 which is formed as an additional combustion chamber for burning the impurities which are contained in the exhaust gasses.

When the inventive device for cleaning of exhaust gasses is installed in the vehicle, it is not necessary to provide a muffler and a catalyst of exhaust gasses since the inventive system performs their functions.

What is claimed is:

1. A vehicle, comprising a vehicle part to be movable on a road; an internal combustion engine mounted on said vehicle for driving said vehicle for movement on the road, said internal combustion engine having an outlet for discharging exhaust gasses and an inlet for introducing a gas into said internal combustion engine; and an exhaust gas system including an exhaust gas conduit having an inlet which is connected with said outlet of said internal combustion engine so as to receive the exhaust gasses from said internal combustion engine, and an outlet which is connected with said gas inlet of said internal combustion engine so that the exhaust gasses which are discharged from said outlet of said internal combustion engine into said inlet of said conduit pass through said conduit and are supplied back into said internal combustion engine without discharging any exhaust gasses into an environment.

2. In a combination with an internal combustion engine, an exhaust gas system, comprising an additional combustion chamber connected to an outlet of the internal combustion engine and receiving exhaust gasses from the internal combustion engine and an air-oxygen mixture without fuel for combustion of the exhaust gasses; a plurality of vessels covered inside with ceramic tiles and a layer of titanium oxide and arranged so that a first one of said vessels is connected with said additional chamber and subsequent ones of said vessels are connected with one another so that the layer of titanium oxide absorbs exhaust gasses exiting said additional vessel; and an air filter having an inlet connected with an outlet of a last one of said vessels and coated from its inside with ceramic tiles with a layer of titanium oxide so as to filter the exhaust gasses received in said air filter from said vessels from combustion products and an additionally absorb residuals of exhaust gas impurities, said air filter having an outlet connected with the internal combustion engine.

3. A vehicle, comprising a vehicle part to be movable on a road; an internal combustion engine mounted on said vehicle for driving said vehicle for movement on the road said internal combustion engine having an outlet for discharging exhaust gasses and an inlet for introducing a gas into said internal combustion engine; and an exhaust gas system including an exhaust gas conduit having an inlet which is connected with said outlet of said internal combustion engine so as to receive the exhaust gasses from said internal combustion engine, and an outlet which is connected with said gas inlet of said internal combustion engine so that the exhaust gasses which are discharged from said outlet of said internal combustion engine into said inlet of said conduit pass through said conduit and are supplied back into said internal combustion engine without discharging any exhaust gasses into an environment, said exhaust system including an additional combustion chamber which is directly connected with said outlet of said internal combustion engine and receives exhaust gasses from said internal combustion engine and also receives an air-oxygen mixture from outside without fuel for combustion of the exhaust gasses and introduces the air-oxygen mixture without fuel into said exhaust system so as to provide combustion of the exhaust gasses.

4. An internal combustion engine, comprising an engine part for providing a movement, said engine part having an outlet for discharging exhaust gasses from said engine part and an inlet; and an exhaust gas system including an exhaust gas conduit having an inlet which is connected with said outlet of said internal combustion engine so as to receive discharged exhaust gasses from said internal combustion engine, and an outlet which is connected with said gas inlet of said internal combustion engine so that the exhaust gasses which pass into said conduit from said outlet of said internal combustion engine into said inlet of sid conduit pass through said conduit and are supplied back into said internal combustion engine without discharging into an environment said exhaust system including an additional combustion chamber which is directly connected with said outlet of said internal combustion engine and receives exhaust gasses from said internal combustion engine and also receives an air-oxygen mixture from outside without fuel for combustion of the exhaust gasses and introduces the air-oxygen mixture without fuel into said exhaust system so as to provide combustion of the exhaust gasses.

5. A vehicle, comprising a vehicle part to be movable on a road; an internal combustion engine mounted on said vehicle for driving said vehicle for movement on the road, said internal combustion engine having an outlet for discharging exhaust gasses and an inlet for introducing a gas into said internal combustion engine; and an exhaust gas system including an exhaust gas conduit having an inlet which is connected with said outlet of said internal combustion engine so as to receive the exhaust gasses from said internal combustion engine, and an outlet which is connected with said gas inlet of said internal combustion engine so that the exhaust gasses which are discharged from said outlet of said internal combustion engine into said inlet of said conduit pass through said conduit and are supplied back into said internal combustion engine without discharging into an environment; means for introducing an air-oxygen mixture into said internal combustion engine and including an air-oxygen containing vessel; a first conduit portion introducing the air-oxygen mixture from said vessel into said internal combustion engine directly, and a second conduit portion introducing a part of said exclusively air-oxygen mixture from said vessel into an additional chamber through which exhaust gasses are passed.

6. A vehicle as defined in claim 5, wherein said additional chamber is a part of said exhaust gas system with said inlet connected with said outlet of said internal combustion engine and with said outlet connected with said gas inlet of said internal combustion engine.

7. An internal combustion engine, comprising an engine part for providing a movement, said engine part having an outlet for discharging exhaust gasses from said engine part and an inlet; and an exhaust gas system including an exhaust gas conduit having an inlet which is connected with said outlet of said internal combustion engine so as to receive discharged exhaust gasses from said internal combustion engine, and an outlet which is connected with said gas inlet of said internal combustion engine so that the exhaust gasses which pass into said conduit from said outlet of said internal combustion engine into said inlet of said conduit pass through said conduit and are supplied back into said internal combustion engine without discharging additional chamber into an environment.

8. A vehicle as defined in claim 7; and further comprising an additional chamber in which exhaust gas and air-oxygen mixture are supplied for additionally burning the exhaust gas so as to prevent any discharge of exhaust gas into an environment.

9. An internal combustion engine as defined in claim 8, wherein said additional chamber is a part of said exhaust gas system with said inlet connected with said outlet of said internal combustion engine and with said outlet connected with said gas inlet of said internal combustion engine.

* * * * *